United States Patent [19]

Mast

[11] Patent Number: 4,470,247
[45] Date of Patent: Sep. 11, 1984

[54] ROUND BALE FORMING MACHINE

[75] Inventor: Aquila D. Mast, Lancaster, Pa.

[73] Assignee: Sperry Corporation, New Holland, Pa.

[21] Appl. No.: 497,932

[22] Filed: May 25, 1983

[51] Int. Cl.³ .................... A01D 39/00; B30B 5/06
[52] U.S. Cl. .................................. 56/341; 100/88
[58] Field of Search ............. 56/341; 100/87, 88, 100/89, 5

[56] References Cited

U.S. PATENT DOCUMENTS

| 3,974,632 | 8/1976 | Van der Lely | 56/341 |
| 4,155,298 | 5/1979 | Gaeddert et al. | 56/341 |
| 4,157,643 | 6/1979 | White | 56/341 |
| 4,172,354 | 10/1979 | Vermeer et al. | 100/88 |
| 4,393,764 | 7/1983 | Viaud | 56/341 |

FOREIGN PATENT DOCUMENTS 64112 11/1982 European Pat. Off. ............ 56/341
3037812 5/1982 Fed. Rep. of Germany ........ 56/341
411805 10/1974 U.S.S.R. ............................ 56/341

Primary Examiner—Robert P. Swiatek
Assistant Examiner—David L. Tarnoff
Attorney, Agent, or Firm—Darrell F. Marquette; Frank A. Seemar; Larry W. Miller

[57] ABSTRACT

A mobile roll baler including a pickup device at the forward end operable to pick up and move a windrow of crop material to a finger feed drum which then moves the material into contact with a section of an expandable and contractable apron driven in a direction to cooperate with the direction of movement of the finger feed drum to effect unidirectional coiling of the material into a roll which is coiled in the same direction in which a finished roll rotates during discharge from the rear of the machine when the tailgate frame is raised and the roll is still rotating from being formed, thereby minimizing discharge time and preventing uncoiling of the roll when discharged from the baler.

7 Claims, 2 Drawing Figures

ROUND BALE FORMING MACHINE

BACKGROUND OF THE INVENTION

This invention relates to the formation of round bales formed by picking up and coiling windrows of crop material and forming the same into a generally coiled configuration of desired diameter and length, one benefit of such bales being that when the same are left in a field, the curved outer surface of the upper portion will shed rain and the like. Formation of such bales is accomplished by various types of machines which have been developed in relatively recent years. It is common in these machines to utilize an endless flexible apron which initially is in a contracted state but gradually expands as the diameter of the roll bale increases.

It also is quite customary in bale forming machines of this type to rotate the bale in a counterclockwise direction, as viewed from the left-hand side of the machine during formation. As a result, when the roll bale is to be discharged, it is desireable to stop counterclockwise rotation of the bale, since the bale will naturally tend to roll in an opposite clockwise direction, as viewed from the left-hand side of the machine, during discharge. It has been found that one further difficulty of such prior machines is that when the completed bale is discharged, its natural clockwise rotation may cause uncoiling thereof since the twine which is wrapped around the bale to prevent such uncoiling may be unwrapped by this clockwise rotation.

SUMMARY OF THE INVENTION

It is an object of the present invention to utilize relatively simple mechanism in a baler to effect the formation of roll bales of crop material, the principal improvement comprising the feeding of windrow material to the baler by initial engagement of the material by a pickup device which passes the material somewhat upwardly and rearwardly for immediate engagement by a finger feed drum which engages the material and moves it into engagement with an expandable section of an endless flexible apron, the movement of the expandable section of the apron being in a reverse direction to the rotary movement of the finger feed drum, thereby effecting initial coiling of the material and, as the roll of material increases in diameter, the expandable section of the apron is gradually expanded and continually surrounds the major portion of the formed roll bale, the purpose of this arrangement being to cause the roll bale to rotate in a direction during formation which will enhance simple rolling of the completed bale from the machine when the roll bale has been formed to a desired size and the tailgate frame of the machine which supports part of the apron is raised upwardly to permit the completed roll bale to freely roll from the machine due to the momentum of the rotating roll bale while being formed.

Another advantage of the foregoing object is that when the tailgate frame is raised for discharge of the roll, the apron may continue to move in the same direction as when forming the coiled roll of material, thereby further facilitating the discharge of the roll bale from the machine.

A further advantage of the foregoing object is that the roll bale will be coiled and then wrapped with twine in the same direction as it naturally tends to roll when discharged thereby preventing uncoiling of the bale and unwrapping of the twine.

Details of the foregoing objects and advantages, as well as other features and objects thereof and the details of the structure comprising the invention, are set forth in the following specification and illustrated in the accompanying drawings comprising a part thereof.

DETAILED DESCRIPTION OF THE PREFERRED EMBODIMENT

Figure 1:
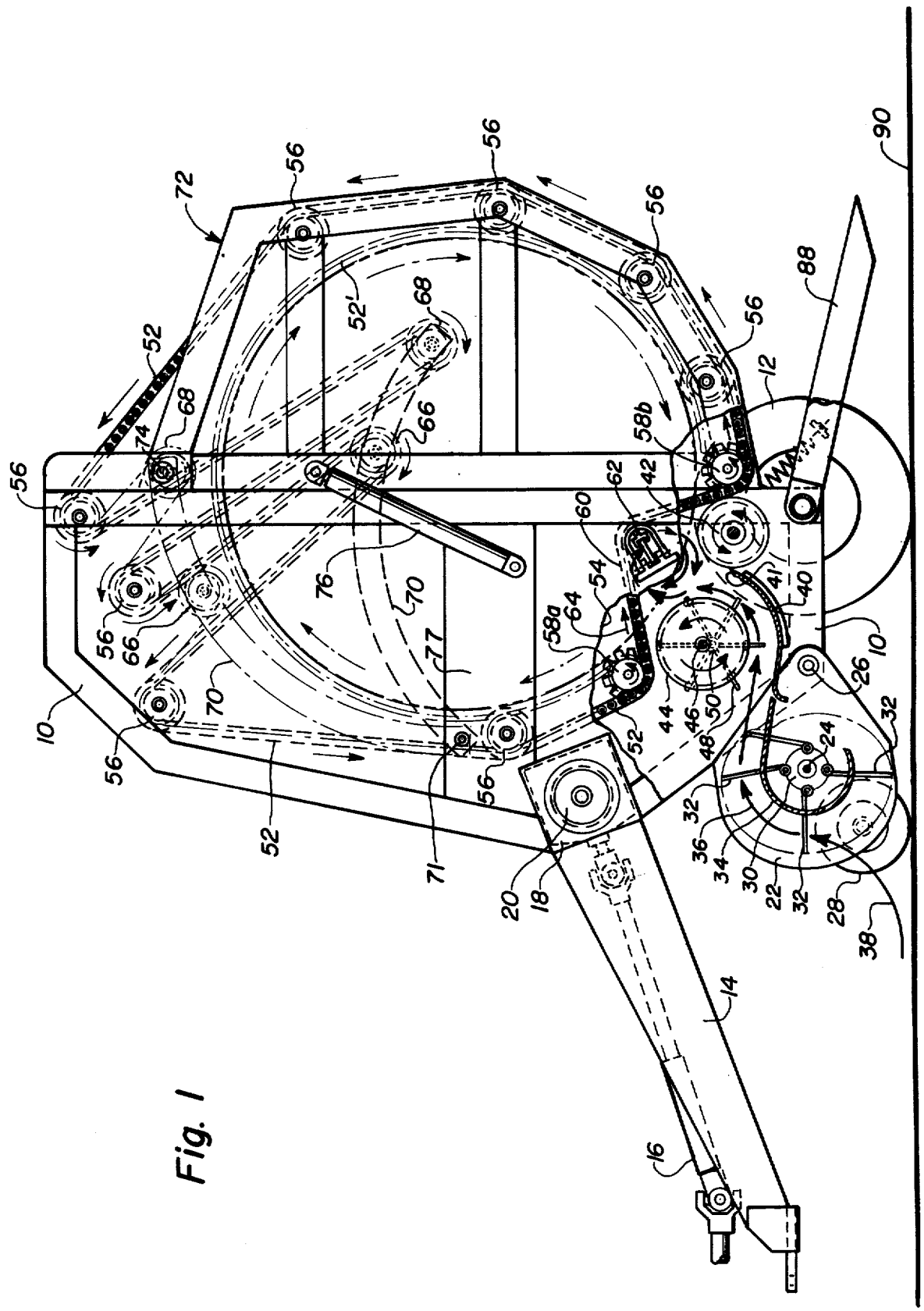
FIG. 1 is a side elevation of the baler embodying the principles of the present invention as seen from the left-hand side thereof, part of the machine being broken away to reveal details of certain elements of the machine.

Referring to FIG. 1, the baler shown therein which embodies the principles of the invention, comprises a mobile frame 10 supported by a pair of wheels 12 at opposite sides of said frame and a forwardly extending tongue 14 attachable at the forward end thereof to a suitable transport means such as a tractor, not shown. Said tractor also preferably has suitable power means for the baler in the form of a PTO, likewise not shown, but of a conventional means on such a tractor. Said PTO actuates a drive shaft 16 which operates a gearbox 18 for powering a main drive sheave 20 which operates all of the moving elements of the baler.

Extending forwardly from the lower portion of mobile frame 10 is a pickup device 22 which supports a transversely extending shaft 24. Pickup device 22 is of a limited floating nature with the rearward portions thereof pivoted at 26 to the lower forward portion of mobile frame 10, and with the forward portions thereof being supported by small wheels 28 at opposite ends of the pickup device 22.

The shaft 24 has flanges 30 spaced therealong with each flange 30 having a plurality of fingers 32 pivoted thereof. The fingers 32 extend through appropriate openings or slots in an arcuate shield 34 which extends partially around the shaft 24 and flanges 30. It will be seen that as the shaft 24 and the fingers 32 rotate in the direction of the arrow 36, the fingers 32 will be projected for engagment with a windrow of crop material to raise the same from the ground, in a path indicated by arrow 38, and to move the material rearwardly around the outer surface of the shield 34 onto a rigid guide plate 40 which extends between the upper end of the shield 34 and a supplemental guide and support roller 42.

As the crop material is moved onto the guide plate 40, it is engaged by what is known conventionally as a finger feed drum 44. The finger feed drum 44 includes a cylinder and is mounted upon a shaft 46 which rotates counterclockwise as shown in FIG. 1 by the direction arrows included therein, and a plurality of fingers 48 are connected at the inner ends thereof to an internal pivot 50 which is offset with respect to the axis of shaft 46. As the finger feed drum 44 revolves, the fingers 48 move from projected position as they engage the material moving along the guide plate 40 to retracted position as they reach the upper portion of the finger feed drum 44. This is due to the offset pivot 50.

As this point in the operation of the machine, it is necessary to describe the endless flexible apron 52 which is of conventional construction. Preferably, the apron 52 comprises a pair of similar endless chains and a plurality of bars or slats which extend between said chains but are spaced therealong at suitable distances. For a fuller description of such aprons, attention is directed to prior U.S. Pat. No. 3,901,007. A portion of apron 52 is shown in the upper right-hand part of FIG. 1 in full lines. Another portion of the apron, above the finger feed drum 44 and supplemental guide and support roller 42 is also shown in full lines in FIG. 1 through an opening 54 broken away in the side of the mobile frame 10. A plurality of guide and support rollers 56 are rotatably supported on the frame 10. The apron 52 extends around these rollers 56 and also around a pair of sprockets 58a, 58b. A section 60 of apron 52 which extends between said pair of sprockets 58a, 58b cooperates with the finger feed drum 44 to contain the crop material which is formed into a roll. The section 60 of the apron also extends around and is supported by guide members 62, and at least one of the sprockets 58a, 58b is driven to move the section 60 of the apron in the direction of arrow 64, whereby said section 60 of the apron engages the material coming from the finger feed drum 44 and rotates the same clockwise as shown by the various directional arrows adjacent guide member 62 in FIG. 1. The apron section 60 has a first portion extending between the sprockets 58 and the guide members 62 and a second portion extending between the sprockets 58 and the guide members 62. Prior to bale formation, the first portion of the apron section 60 moves in a substantially rearward direction with respect to the mobile frame 10 and the second portion of the apron section 60 moves in a substantially downward direction with respect to the mobile frame 10 as seen in FIG. 1. The apron 52 extends around additional idlers 66 and 68 which are supported upon a pair of arcuate arms 70 which are pivoted at 71 on the frame 10. The arms 70 are shown by broken lines in FIG. 1, in their lower position and in their upper position.

It will be understood that as the coiled roll of crop material is rotated clockwise as shown in FIG. 1, it will increase in diameter and in doing so moves the section 60 of apron 52 out of contact with the guide members 62 and ultimately into the substantially circular, large diameter disposition 52' of said apron. In said latter disposition, the roll bale has substantially been formed to its desired diameter and is ready to be discharged for the machine. While being formed, the roll bale is supported collectively by finger feed drum 44, supplemental guide and support roller 42, and the section 60 of the apron 52 which extends around the roll bale. The supplemental guide and support roller 42 also serves to strip crop material from the apron 52 and thereby minimize the amount of crop material which may be lost between the roller 42 and apron 52 during bale formation. Likewise, the guide plate 40 has an edge 41 thereof which is positioned to strip crop material from the supplemental guide and support roller 42 to further minimize the loss of crop material.

The mobile frame 10 supports what is commonly known as a tailgate frame 72 which is used in the discharge of a completed bale. The tailgate frame 72 is shown elevated in FIG. 2 where it will be seen that an upper corner thereof has pivot means 74 which connect the tailgate frame to the mobile frame 10. The tailgate frame 72 is moved from the normal, closed position thereof, shown in FIG. 1, to an elevated, open position thereof by means of a pair of hydraulic cylinders 76 which extend between a stationary frame member 77 on mobile frame 10 and the innermost frame member 78 of the tailgate frame 72.

Figure 2:
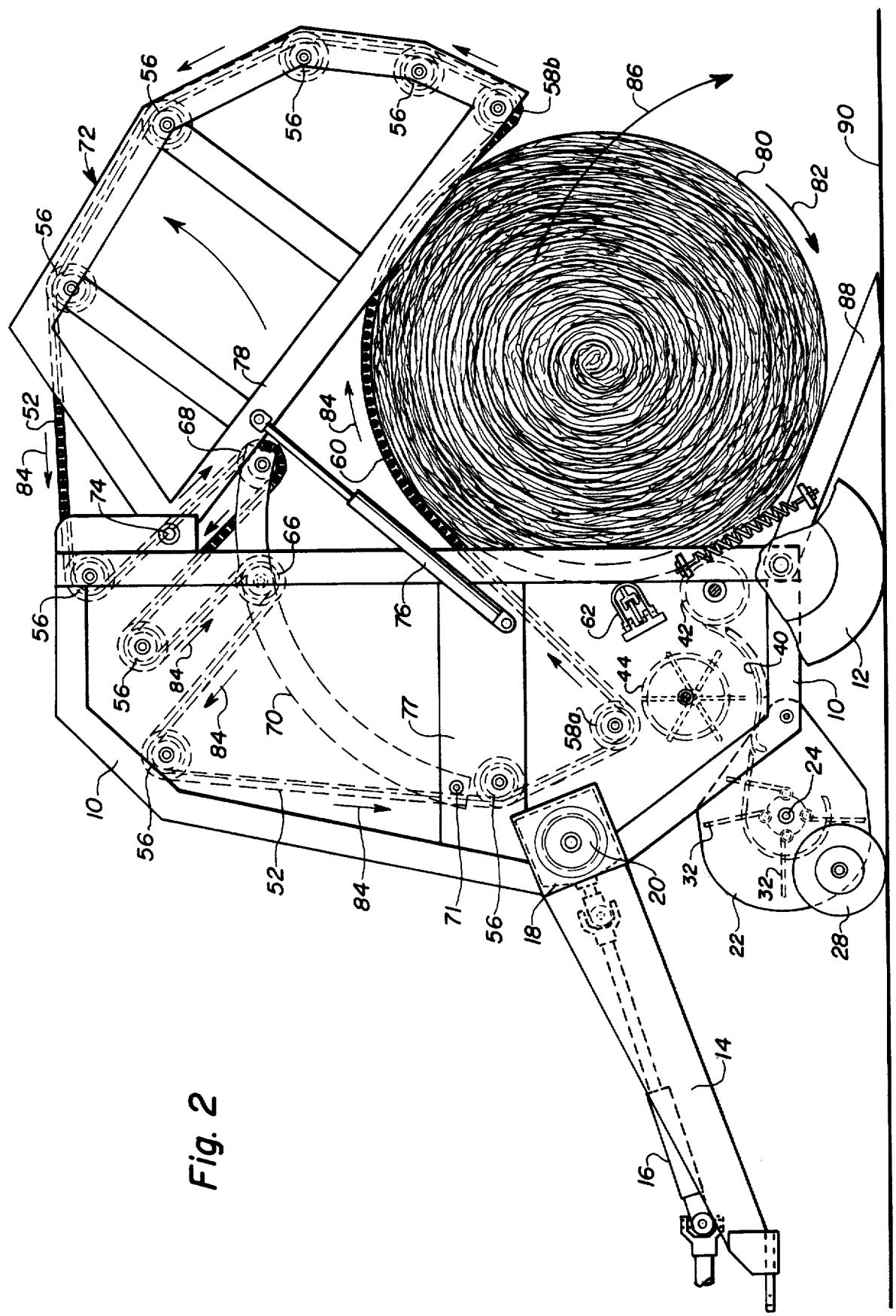
FIG. 2 is a side elevation of the machine shown in FIG. 1 illustrating the tailgate frame of the machine elevated partially as when a completed bale is being discharged by natural rolling from the machine.

When the roll bale 80 has been completed by coiling the crop material spirally into a roll of desired diameter as illustrated in exemplary manner in FIG. 2, a suitable valve, not shown, is actuated by the operator of the tractor to expand the hydraulic cylinders 76 at opposite sides of the frame 10 to raise the tailgate frame 72 as shown in FIG. 2 in order that the roll bale 80, which has been rotating clockwise during formation as viewed in FIGS. 1 and 2 and as indicated by the direction arrow 82, is discharged. Upon the raising of the tailgate frame 72, it will be seen that the apron 52 continues moving in the direction of the arrows 84 and the section 60 of the apron which engages the upper portion of the roll bale 80 further urges the roll bale 80 to roll outwardly and downwardly in its natural clockwise direction as indicated by arrow 86. A ramp 88 is pivotally connected to the mobile frame 10 in order that the roll bale 80 may be eased in its natural rolling manner down to the ground surface 90.

As soon as the completed roll bale 80 has been discharged as described, the hydraulic cylinders 76 are contracted rapidly to restore the tailgate frame 72 closed to the position shown in FIG. 1 and as the tractor or other means which propels the baler resumes forward movement, the apron 52 already is in operation along with pickup device 22, finger feed drum 44, and supplemental guide and support roller 42. These elements are all driven either directly or indirectly from the main drive sheave 20 by conventional means such as chains and sprockets or belts and sheaves.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. A roll baling machine comprising in combination:
   (a) a mobile frame;
   (b) a flexible apron movably supported on said mobile frame having a section thereof which is expandable in length during bale formation, said apron expandable section having a first portion which, prior to bale formation, moves in a substantially rearward direction with respect to said mobile frame and a second portion which, prior to bale formation, moves in a substantially downward direction with respect to said mobile frame;
   (c) pickup means supported on said mobile frame for engaging and picking up crop material;
   (d) a finger drum positioned substantially underneath said first portion of said apron expandable section for receiving crop material from said pickup means and for moving said crop material into engagement with said apron expandable section in order to form said crop material into a roll bale;
   (e) a guide and support roller positioned intermediate said finger drum and said second portion of said apron expandable section to assist said finger drum and said apron expandable section in forming and supporting said roll bale; and
(f) said roll bale being rotated in the same direction, while being formed, as it naturally tends to roll when discharged from the machine.

2. The roll baling machine according to claim 1, wherein said finger drum and said guide and support roller are rotated in a direction which is opposite to the direction of movement of said apron expandable section.

3. The roll baling machine according to claim 2, further comprising a guide plate mounted on said mobile frame extending between said pickup means and said guide and support roller and located underneath said finger drum to direct said crop material for engagement with said apron expandable section in order to form said roll bale.

4. The roll baling machine according to claim 3, wherein said guide and support roller also serves to strip crop material from said apron, and wherein said guide plate has an edge thereof positioned to strip crop material from said guide and support roller, said guide and support roller and said guide plate thereby serving to minimize the loss of crop material from the machine during bale formation.

5. The roll baling machine according to claim 1, wherein said finger drum comprises a cylinder mounted on a rotatable shaft, a plurality of fingers mounted on pivot means located inside said cylinder, the axis of said pivot means being offset relative to the axis of said rotatable shaft so that said plurality of fingers project from and retract into said cylinder as said cylinder is rotated.

6. The roll baling machine according to claim 5, wherein said plurality of fingers project from said cylinder when they are adjacent said pickup means and retract into said cylinder when they are adjacent said first portion of said apron expandable section.

7. The roll baling machine according to claim 1, further comprising a tailgate frame pivotally connected to said mobile frame for movement between a closed position and an open position, said apron normally moving in a direction which causes said apron to urge said roll bale to roll out of the machine in its natural direction when said tailgate frame is moved to said open position.

* * * * *